(12) United States Patent
Murray

(10) Patent No.: US 6,496,709 B2
(45) Date of Patent: Dec. 17, 2002

(54) APPARATUS AND METHOD FOR SPEED SENSITIVE OPERATION IN A WIRELESS COMMUNICATION DEVICE

(75) Inventor: Bradley Arlice Murray, West Palm Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 25 days.

(21) Appl. No.: 09/796,335

(22) Filed: Mar. 2, 2001

(65) Prior Publication Data

US 2002/0123329 A1 Sep. 5, 2002

(51) Int. Cl.[7] .................................................. H04B 1/38
(52) U.S. Cl. .......................... 455/569; 455/456; 455/412
(58) Field of Search .................................. 455/412, 414, 455/456, 73, 550, 553, 569, 575, 345, 346, 441, 238.1; 701/213

(56) References Cited

U.S. PATENT DOCUMENTS

| | | |
|---|---|---|
| 4,737,976 A | 4/1988 | Borth et al. |
| 5,588,041 A | 12/1996 | Meyer, Jr. et al. |
| 5,749,072 A | 5/1998 | Mazurkiewicz et al. ..... 704/275 |
| 5,802,167 A | 9/1998 | Hong |
| 6,108,532 A * | 8/2000 | Matsuda et al. ............. 455/412 |
| 6,150,961 A * | 11/2000 | Alewine et al. ............ 455/575 |
| 6,223,034 B1 * | 4/2001 | Yamashita ................... 455/550 |
| 2001/0034250 A1 * | 10/2001 | Chadha ....................... 455/575 |

\* cited by examiner

Primary Examiner—Lester G. Kincaid
(74) Attorney, Agent, or Firm—Randi L. Dulaney

(57) ABSTRACT

A wireless communication device (30) within a wireless communication system (10) includes a receiver (68) for receiving a message, a processor (78) coupled to the receiver (68) for processing the message, and a memory (80) coupled to the processor (78). The memory (80) includes a message memory (94) for storing the message and a location memory (96) for storing location information (100). The wireless communication device (30) further includes an operation mode management application (90) coupled to the processor (78). The operation mode management application (90) identifies at least one operation mode (112), and enables the operation mode (112) in response to a processor command (104) received from the processor (78).

10 Claims, 4 Drawing Sheets

APPARATUS AND METHOD FOR SPEED SENSITIVE OPERATION IN A WIRELESS COMMUNICATION DEVICE

BACKGROUND OF THE INVENTION

1. Field of the Invention

This invention relates in general to wireless communication devices and in particular to wireless communication devices with speed sensitive operation.

2. Description of the Related Art

Wireless communication devices, such as two-way pagers and cellular telephones, have become more popular in recent years. This is due, in part, to the variety of conveniences they afford users. Much of the popularity of wireless communication devices comes from the added ability provided to the user to place and receive calls and messages wirelessly.

Recently, cellular telephones have been designed with the capability to be used in a "hands-free" mode of operation using a full-duplex speakerphone. This "hands-free" mode of operation is particularly beneficial when a user receives an incoming call. The user is able to answer the phone and have a conversation without having to manipulate buttons or hold the phone to the user's ear.

One disadvantage with the current implementation of the "hands-free" mode is the need to enter a specific sequence of button presses to place the handset in the "hands-free" mode. This requires the user to remember the proper procedure for placing the phone in the "hands-free" mode. Another disadvantage is that the "hands-free" mode may not always be appropriate, such as when the user is attending a meeting. This requires the user to remember to disable the "hands-free" mode before attending the meeting. The user is again required to remember the proper procedure for turning off the "hands-free" mode.

Recently, some wireless communication devices have been designed to include the capability to determine the device's current location. For example, a wireless communication system can use direction-finding equipment at each base station site in order to fix the location of the handset. The current location is computed by triangulation when two or more transmitter base stations receive the same signal. Once the wireless communication device's location is determined, it may be used along with the current time to calculate the speed and direction of the wireless communication device.

Similarly, the portable wireless communication device can include a Global Positioning System (GPS) receiver for determining its location. The Global Positioning System (GPS) is a worldwide radio-navigation system formed from a constellation of 24 satellites and their ground stations. The GPS receiver uses signals received from the satellites to calculate the current position, heading, speed and even altitude of the wireless communication device equipped with the GPS receiver.

What is needed is an improved method of automatically placing a wireless communication device equipped with location finding capability in the proper operational mode based upon the surrounding conditions in which the wireless communication device is being used.

DETAILED DESCRIPTION OF THE INVENTION

Figure 1:
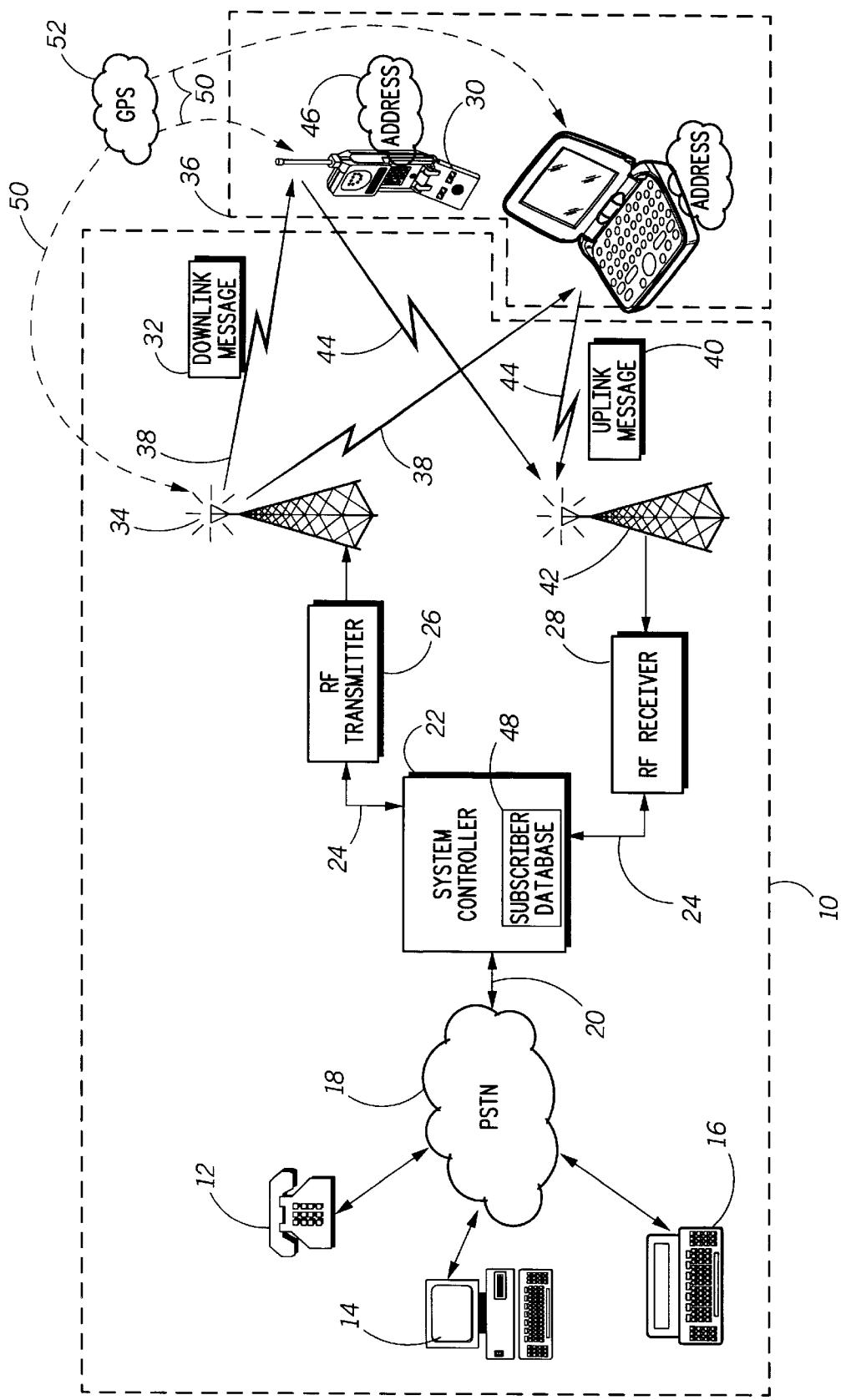
FIG. 1 is an electronic block diagram of a wireless communication system.

Referring to FIG. 1, an electronic block diagram of a wireless communication system 10 is shown. The wireless communication system 10 includes a message input device for initiating messages into the wireless communication system 10. The message input device can be, for example, a telephone 12, a computer 14, or a desktop messaging unit 16, connected through a conventional public switched telephone network (PSTN) 18 through a plurality of telephone links 20 to a system controller 22. The telephone links 20, for example, can be a plurality of twisted wire pairs, a fiber optic cable, or a multiplexed trunk line.

The system controller 22 is coupled to and oversees the operation of at least one radio frequency (RF) transmitter 26 and at least one radio frequency (RF) receiver 28 through one or more communication links 24. The communication links 24 typically are twisted pair telephone wires, and additionally can include radio frequency (RF), microwave, or other communication links. The radio frequency transmitter 26 and the radio frequency receiver 28 typically are used with message store and forward stations that encode and decode inbound and outbound messages into formats that are compatible with landline message switched computers and personal radio addressing requirements, such as cellular messages, short messaging service, or paging protocols. The system controller 22 can also function to encode and decode wireless messages that are transmitted to or received by the radio frequency transmitter 26 or the radio frequency receiver 28. Telephony signals are typically transmitted to and received from the system controller 22 by telephone sets such as the telephone 12 or a wireless communication device 30. The system controller 22 encodes and schedules outbound messages such as a downlink message 32. The system controller 22 then transmits the encoded outbound messages through the radio frequency transmitter 26 via a transmit antenna 34 to a plurality of wireless communication devices 36 such as the wireless communication device 30 on at least one outbound radio frequency (RF) channel 38. The downlink message 32 can be, for example, a data message or a voice call. Similarly, the system controller 22 receives and decodes inbound messages such as an uplink message 40 received by the radio frequency receiver 28 via a receive antenna 42 on at least one inbound radio frequency (RF) channel 44 from one of the plurality of wireless communication devices 36. The uplink message 40 can be, for example, a data message, a reply to a data message, a voice call, or a reply to a voice call.

It will be appreciated by one of ordinary skill in the art that the wireless communication system 10, in accordance with the present invention, can function utilizing any wireless RF channel, for example, a one or two-way pager channel, a mobile cellular telephone channel, or a mobile radio channel. Similarly, it will be appreciated by one of ordinary skill in the art that the wireless communication system 10 can function utilizing other types of communication channels such as infrared channels. In the following description, the term "wireless communication system" refers to any of the wireless communication systems mentioned above or an equivalent.

Similarly, it will be appreciated by one of ordinary skill in the art that the wireless communication device 30 in accordance with the present invention, can be a mobile cellular telephone, a mobile radio data terminal, a mobile cellular telephone having an attached data terminal, or a two way pager, such as the "Pagewriter 2000X" manufactured by Motorola Inc. of Schaumburg, Ill. In the following description, the term "wireless communication device" refers to any of the devices mentioned above or an equivalent.

The wireless communication device 30 assigned for use in the wireless communication system 10 has an address 46 or identity assigned thereto which is a unique selective call address in the wireless communication system 10. It will be appreciated by one of ordinary skill in the art that other wireless communication devices assigned for use in the wireless communication system 10 have an address assigned thereto which is a unique selective call address in the wireless communication system 10.

The address 46 enables the transmission of the downlink message 32 from the system controller 22 only to the wireless communication device 30 having the address 46, and identifies the messages and responses received at the system controller 22 from the wireless communication device 30 with the address 46. In one embodiment, each of the plurality of wireless communication devices 36 also has a pin number assigned thereto, the pin number being associated with a telephone number within the PSTN 18. A list of the assigned addresses and correlated telephone numbers for each of the plurality of wireless communication devices 36 is stored in the system controller 22 in the form of a subscriber database 48.

In a preferred embodiment of the present invention, the wireless communication device 30 calculates its location position utilizing a plurality of GPS signals 50 broadcast from a GPS system 52 in a manner well known in the art.

Figure 2:
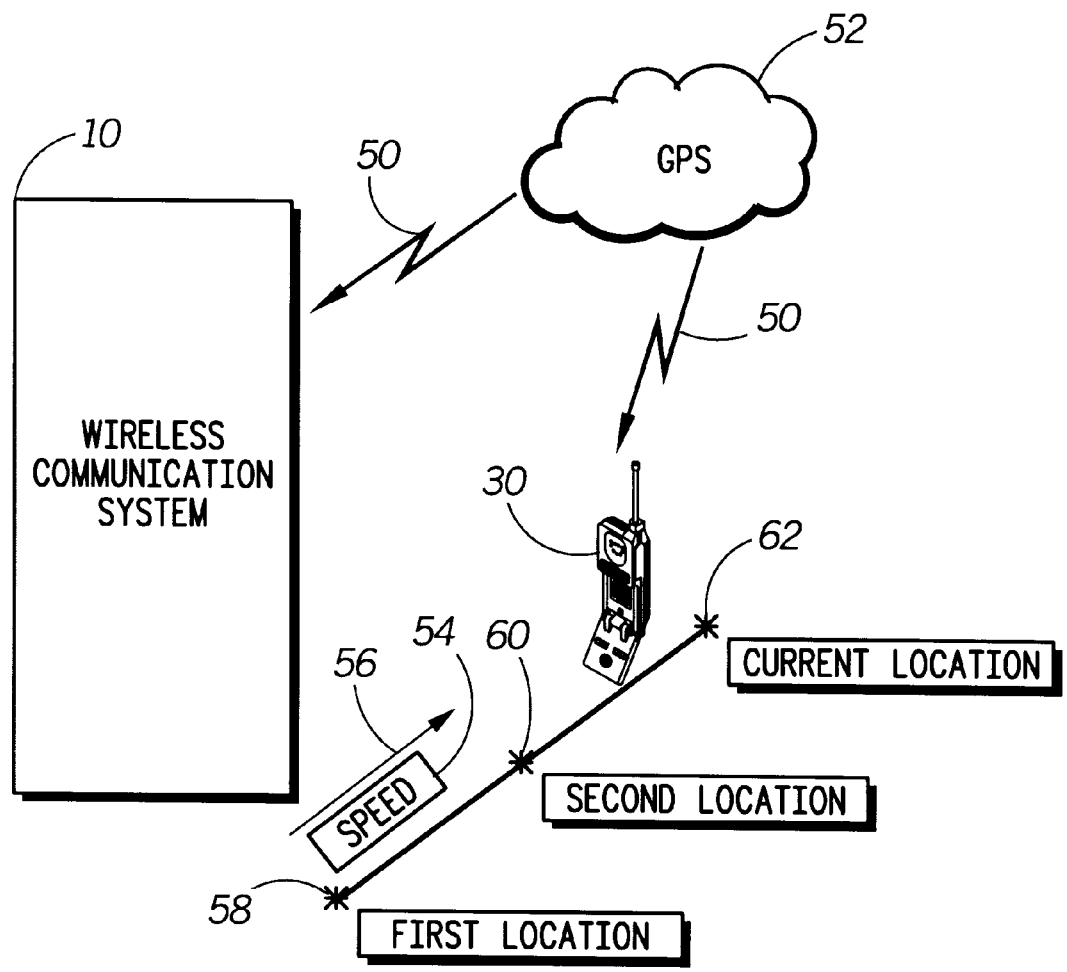
FIG. 2 is an electronic block diagram of one embodiment of the wireless communication system of FIG. 1 in accordance with the present invention.

FIG. 2 is an electronic block diagram illustrating the interaction of the plurality of wireless communication devices 36, the wireless communication system 10, and the GPS system 52. The wireless communication device 30 in FIG. 2 can be traveling, for example, at a movement speed 54, and in a movement direction 56 from a first location 58 to a second location 60 and then to a current location 62. The detection and notification of the first location 58, the second location 60, the current location 62, the movement direction 56, and the movement speed 54 of the wireless communication device 30 can be done by either the wireless communication device 30 itself or the wireless communication system 10 or a combination of both. For example, in a wireless communication system 10 using the ReFLEX protocol, each radio tower is assigned a 'Color Code', which is embedded in the frame synchronization word broadcasted to the plurality of wireless communication devices such as the wireless communication device 30. The wireless communication device 30 can determine its relative location by comparing the current color code against an earlier color code. Similarly, in the GSM protocol, the Base Identification Code (BSIC) broadcasted on the SCH of every cell allows a mobile station to distinguish among neighboring cells. The movement direction 56 and the movement speed 54 are calculated using a plurality of received location points such as the first location 58 and the second location 60.

Alternatively, the wireless communication system 10 can use a very high-frequency omni directional range (VOR), which is used primarily as a navigation aid for aircraft compares the phase of a fixed and rotating signal to compute its angle with respect to a transmitter station. In a VOR system, a transmitter emits a (variable) modulation whose phase relative to a reference modulation is different for each bearing of the receiving point from the station. The typical radio frequency (RF) bandwidth required for a VOR system is around 25 kilohertz (KHz).

Alternatively, as illustrated in FIG. 2, the current location 62 of the wireless communication device 30 can be determined using the Global Positioning System (GPS) 52. The Global Positioning System is a worldwide radio-navigation system formed from a constellation of 24 satellites and their ground stations. GPS uses these "man-made stars" as reference points to calculate positions accurate to a matter of meters. The satellites in space are used as reference points for locations here on earth.

It will be appreciated by one of ordinary skill in the art that the wireless communication system 10 and/or the wireless communication device 30, in accordance with the present invention, can determine the first location 58, the second location 60, the current location 62, the movement direction 56, and the movement speed 54 of the wireless communication device 30 using the systems mentioned above or an equivalent.

Figure 3:
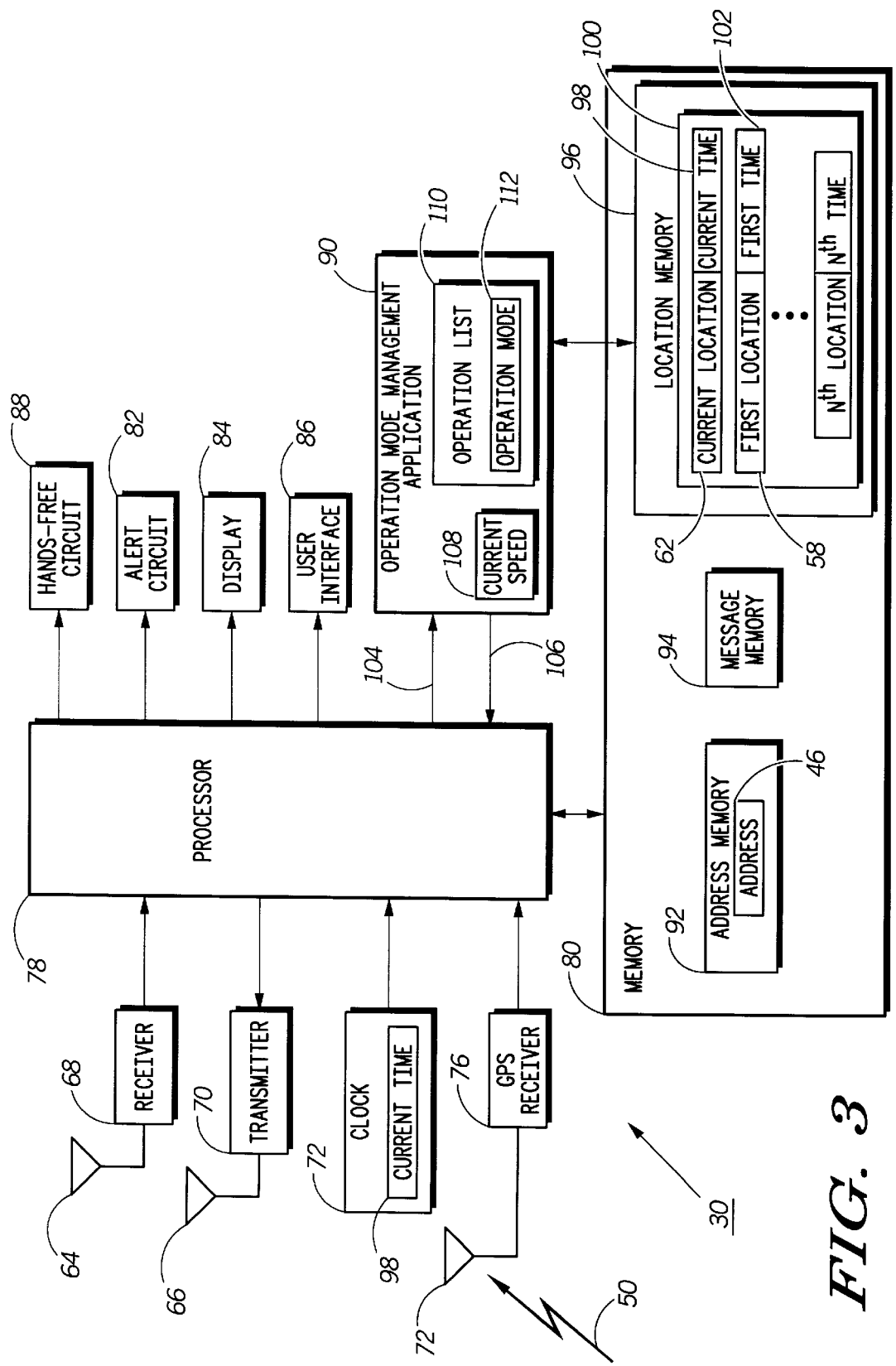
FIG. 3 is an electronic block diagram of a wireless communication device for use within the wireless communication system of FIGS. 1 and 2.

FIG. 3 is electronic block diagram of a preferred embodiment of the wireless communication device 30 for use within the wireless communication system 10. It will be appreciated by one of ordinary skill in the art that the electronic block diagram of FIG. 3 is illustrative of each of the plurality of wireless communication devices 36 assigned for use in the wireless communication system 10.

Referring to FIG. 3, the wireless communication device 30 includes a first antenna 64, a second antenna 66, a receiver 68, a transmitter 70, a clock 72, a GPS antenna 74, a GPS receiver 76, a processor 78, a memory 80, an alert circuit 82, a display 84, a user interface 86, a hands-free circuit 88, and an operation mode management application 90. It will be appreciated by one of ordinary skill in the art that the operation mode management application 90 can be a software program or any other equivalent.

The first antenna 64 intercepts transmitted signals from the wireless communication system 10. The first antenna 64 is coupled to the receiver 68, which employs conventional demodulation techniques for receiving the communication signals transmitted by the wireless communication system 10 such as the downlink message 32 of FIG. 1.

Coupled to the receiver 68, is the processor 78 utilizing conventional signal-processing techniques for processing received messages. Preferably, the processor 78 is similar to the MC68328 micro-controller manufactured by Motorola, Inc. of Schaumburg, Ill. It will be appreciated by one of ordinary skill in the art that other similar processors can be utilized for the processor 78, and that additional processors of the same or alternative type can be utilized as required to handle the processing requirements of the processor 78.

The processor 78 decodes an address in the demodulated data of the received message, compares the decoded address with one or more addresses such as the address 46 stored in an address memory 92 of the memory 80; and when a match is detected, proceeds to process the remaining portion of the received message.

To perform the necessary functions of the wireless communication device 30, the processor 78 is coupled to the memory 80, which preferably includes a random access memory (RAM), a read-only memory (ROM), and an electrically erasable programmable read-only memory (EEPROM)(not shown). The memory 80 also includes the address memory 92, a message memory 94, and a location memory 96. The location memory 96 preferably includes a plurality of location information 100. The plurality of location information 100, for example, can include the current location 62, a current time 98 as well as previous locations and associated times such as the first location 58 and a first time 102. It will be appreciated by one of ordinary skill in the art that the plurality of location information 100, in accordance with the present invention, can include any number of previous locations and associated previous times. Further, it will be appreciated by one of ordinary skill in the art that, in accordance with the present invention, the number of previous locations and associated previous times can be variable, fixed, and/or modifiable.

Once the processor 78 has processed a received message, it stores the decoded message in the message memory 94. It will be appreciated by one of ordinary skill in the art that the message memory 94, in accordance with the present invention, can be a voicemail box or a group of memory locations in a data storage device. In the following description, the term "message memory" refers to any of the memory means mentioned above or an equivalent.

Upon receipt and processing of a message, the processor 78 preferably generates a command signal to the alert circuit 82 as a notification that the message has been received and stored. The alert circuit 82 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 82.

Upon receipt of a message, the processor 78 preferably also generates a command signal to the display 84 to generate a visual notification of the receipt and storage of the message. When the display 84 receives the command signal from the processor 78 that the message has been received and stored in the message memory 94, a message indication is displayed. The message indication, for example can be the activation of one of a plurality of message icons on the display 84. The display 84 can be, for example, a liquid crystal display utilized to display text. It will be appreciated by one of ordinary skill in the art that other similar displays such as dot matrix displays can be utilized for the display 84.

The wireless communication device 30 preferably further includes the clock 72. The clock 72 provides timing for the processor 78. The clock 72 can include the current time 98 for use in the operation of the wireless communication device 30. The clock 72 also provides a source for timing of feature enhancements such as active and inactive periods of operation or periods of alerting.

In a preferred embodiment, the wireless communication device 30 includes the operation mode management application 90. The wireless communication device 30 performs operation mode management functions within the operation mode management application 90 using a processor command 104 sent from the processor 78. The operation mode management application 90 sends an application response 106 in reply to the processor command 104. The operation mode management application 90 preferably includes a current speed 108 and an operation mode list 110. The operation mode management application 90 can be hard coded or programmed into the wireless communication device 30 during manufacturing, can be programmed over-the-air upon customer subscription, or can be a downloadable application. It will be appreciated by one of ordinary skill in the art that other programming methods can be utilized for programming the operation mode management application 90 into the wireless communication device 30.

The operation mode management application 90 preferably is programmed to enable an operation mode 112 from the operation mode list 110. The operation mode management application 90, in response to the processor command 104, preferably accesses the location memory 96 of the memory 80. The operation mode management application 90 is programmed to calculate the current speed 108 using the plurality of location information 100 stored in the location memory 96 by using predetermined algorithms, as is well known in the art. The operation mode management application 90 is preferably programmed with a set of rules identifying the operation mode 112 dependent upon the current speed 108. When the operation mode management application 90 identifies the operation mode 112, the operation mode management application 90 sends the application response 106 to the processor 78. The processor 78, in response to receipt of the application response 106, enables the operation mode 112. For example, when the operation mode 112 is a hands-free operation mode, the processor 78 sends a command signal to the hands-free circuit 88 to activate the hands-free operation of the wireless communication device 30. The hands-free circuit 88, for example, can include a speaker, a microphone and control circuitry for allowing the wireless communication device 30 to operate as a speakerphone.

Preferably, the user interface 86 is coupled to the processor 78, as shown in FIG. 3. The user interface 86 can be one or more buttons used to generate a button press, a series of button presses, a voice response from the device user, or some other similar method of manual response initiated by the device user of the wireless communication device 30. The processor 78, in response to the user interface 86, initiates the processor command 104 to the operation mode management application 90. The operation mode management application 90, in response to the processor command 104, calculates the current speed 108 and identifies the operation mode 112 as described previously. In this manner, the operation mode 112 can be altered directly by the user of the wireless communication device 30.

The transmitter 70 is coupled to the processor 78 and is responsive to commands from the processor 78. When the transmitter 70 receives a command from the processor 78, the transmitter 70 sends a signal via the second antenna 66 to the wireless communication system 10. The signal, for example, can be the uplink message 40. (see FIG. 1).

In an alternative embodiment (not shown), the wireless communication device 30 includes one antenna performing the functionality of the first antenna 64 and the second antenna 66. Further, the wireless communication device 30 alternatively includes a transceiver circuit performing the functionality of the receiver 68 and the transmitter 70. It will be appreciated by one of ordinary skill in the art that other similar electronic block diagrams of the same or alternate type can be utilized for the wireless communication device 30 to handle the requirements of the wireless communication device 30.

The wireless communication device 30 further preferably comprises the GPS receiver 76 and the GPS antenna 74. The GPS receiver 76 receives the plurality of GPS signals 50 broadcasted from the GPS system 52 via the GPS antenna 74. The processor 78 processes the plurality of GPS signals 50 as received, in a manner well known in the art, to calculate the current location 62 of the wireless communication device 30.

The GPS receiver 79 is coupled to the processor 78. The processor 78 is coupled to the memory 80, which in response to receiving a command that includes information from the GPS receiver 79 stores the current location 62, preferably in the form of a latitude and longitude, along with the current time 98 in the location memory 96 portion of the memory 80. The current location 62 can be determined from the processing of the plurality of GPS signals 50 in the memory 80 for later use by the operation mode management application 90. The GPS receiver 79 provides an accurate method for the wireless communication device 30 to determine the current location 62 as well as direction of travel and speed.

Figure 4:
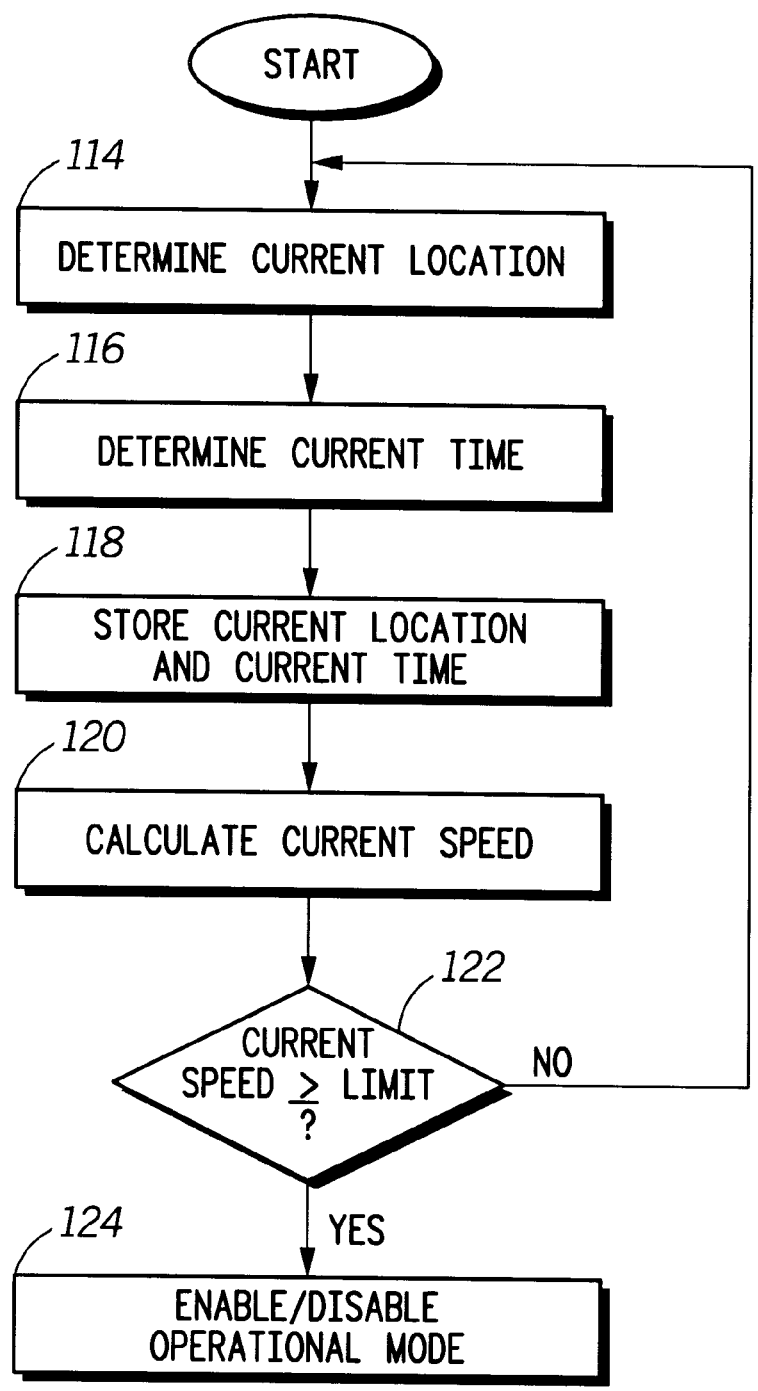
FIG. 4 is a flowchart illustrating the operation of the wireless communication device of FIG. 3 in accordance with the present invention.

FIG. 4 is a flowchart illustrating one embodiment of the operation of the wireless communication device 30 of FIG. 3 within the wireless communication system 10 of FIG. 1 in accordance with the present invention. In Step 114, the processor 78 determines the current location 62. Preferably, the processor 78 calculates the current location 62 using the plurality of GPS signals 50 as received. Alternatively, the processor 78 calculates the current location 62 using information contained within the downlink message 32. It will be appreciated by one of ordinary skill in the art that, in accordance with the present invention, the processor 78 can calculate the current location 62 in the described methods or an equivalent. Next, in Step 116, the processor 78 determines the current time 98. Preferably, the processor 78 receives the current time 98 from the clock 72. Alternatively, the processor 78 receives the current time 98 using information contained within the downlink message 32. It will be appreciated by one of ordinary skill in the art that, in accordance with the present invention, the processor 78 can receive and/or calculate the current time 98 in the described methods or an equivalent. Next, in Step 118, the processor 78 stores the current location 62 and the current time 98 in the location memory 96 of the memory 80. Next, in Step 120, the operation mode management application 90 calculates the current speed 108 using the plurality of location information 100 including the current location 62, the current time 98 and previous locations and times stored in the location memory 96 by using predetermined algorithms, as is well known in the art. Next, in Step 122, the operation mode management application 90 compares the current speed 108 to a predefined speed limit. When the current speed 108 does not exceed the predefined speed limit, the process returns to Step 114. In Step 124, when the current speed 108 exceeds the predefined speed limit, the operation mode management application 90 is preferably programmed with a set of rules identifying the operation mode 112 to enable. For example, when the current speed 108 exceeds the predefined speed limit, the operation mode management application 90 can enable a hands free mode. Further, an indication can be provided to the user that a particular mode of operation has been changed.

If the current speed 108 subsequently goes below the predefined speed limit, the operation mode management application 90 could disable the hands free mode. Alternatively, the operation mode management application 90 could allow a user to set time parameters which would require the current speed 108 to be maintained for a preset period of time before a mode is enable or disabled.

Other operation modes of the wireless communication device can be controlled by the operation mode management application 90. For example, a voice control feature may be activated if the speed of the wireless device reaches a predefined limit. Voice control allows a user to control certain operations of a wireless communication device, such as adjusting the volume, by using voice commands. In this way, the user can audibly control the features of the wireless device without having to come into physical contact with the device. Alternatively, a speech-to-text feature may activate if the speed of the wireless device reaches a predefined limit. Speech-to-text circuitry can convert spoken voice into words. In this way, the user can audibly construct a message and send it to the appropriate destination without having to come into physical contact with the wireless communication device.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. A wireless communication device within a wireless communication system for receiving a message, the wireless communication device comprising:

a receiver for receiving the message;

a processor coupled to the receiver for processing the message;

a memory coupled to the processor, wherein the memory includes a message memory for storing the message and a location memory for storing location information; and an operation mode management application coupled to the processor, wherein the operation mode management application is programmed to:

access the location memory, calculate a current speed using location information stored in the location memory, compare the current speed to a speed limit;

repeat the accessing, calculating, and comparing steps for a user defined period of time when the current speed exceeds the speed limit, and identify an operation mode when the current speed exceeds the speed limit for the user defined period of time.

2. A wireless communication device as recited in claim 1, wherein the processor enables the operation mode in response to the operation mode management application identifying the operation mode.

3. A wireless communication device as recited in claim 1, wherein the wireless communication device further comprises a hands-free circuit, and further wherein the operation mode is a hands-free operation, and further wherein the processor activates the hands-free circuit in response to the operation mode management application identifying the operation mode as the hands-free operation.

4. A wireless communication device as recited in claim 1, wherein the wireless communication device further comprises a clock, wherein the clock includes a current time, and further wherein the location information stored in the location memory includes the current time.

5. A wireless communication device as recited in claim 4, wherein the location information includes a current location, the current time, a plurality of previous locations and a plurality of previous times.

6. A wireless communication device as recited in claim 1, wherein the wireless communication device further includes a GPS receiver coupled to the processor for receiving a plurality of GPS signals, wherein the processor calculates a current location using the plurality of GPS signals, and further wherein the processor stores the current location in the location memory.

7. A method for speed sensitive operation in a wireless communication device having a processor, a memory, and an operation mode management application, the method for speed sensitive operation comprising:

determining a current location and a current time by the processor;

storing the current location and the current time in the memory;

calculating a current speed using the current location, the current time and a plurality of previous location information stored in memory by the operation mode management application;

comparing the current speed to a speed limit;

repeating the determining, storing, and calculating steps for a user defined period of time when the current speed exceeds the speed limit;

identifying an operation mode when the current speed exceeds the speed limit for the user defined period of time; and enabling the operation mode.

8. A method for speed sensitive operation in a wireless communication device as recited in claim 7 wherein the method further comprises:

disabling the identified operational mode when the current speed no longer exceeds the speed limit.

9. A method for speed sensitive operation in a wireless communication device having a processor, a memory, and an operation mode management application, the method for speed sensitive operation comprising:

determining a current speed;

storing the current speed in the memory;

comparing the current speed to a speed limit;

repeating the determining, storing, and comparing steps for a user defined period of time when the current speed exceeds the speed limit;

identifying an operation mode when the current speed exceeds the speed limit for the user defined period of time; and enabling the operation mode.

10. A method for speed sensitive operation in a wireless communication device as recited in claim 9 wherein the wireless communication device includes a GPS receiver, the method further comprising prior to the determining step:

receiving a plurality of GPS signals by the GPS receiver;

calculating a plurality of locations using the plurality of received GPS signals; and storing the plurality of locations in the location memory, wherein the current speed is determined in the determining step using the stored plurality of locations.

* * * * *